(12) United States Patent
Torita

(10) Patent No.: US 7,581,604 B2
(45) Date of Patent: Sep. 1, 2009

(54) MOTORIZED WHEELCHAIR

(75) Inventor: Hideki Torita, Yokohama (JP)

(73) Assignee: Kanto Auo Works, Ltd., Kanagawa-ken (JP)

( * ) Notice: Subject to any disclaimer, the term of this patent is extended or adjusted under 35 U.S.C. 154(b) by 163 days.

(21) Appl. No.: 11/715,514

(22) Filed: Mar. 8, 2007

(65) Prior Publication Data

US 2007/0261897 A1    Nov. 15, 2007

(30) Foreign Application Priority Data

May 11, 2006    (JP)    ............................. 2006-132274

(51) Int. Cl.
    *B62D 11/02*    (2006.01)
(52) U.S. Cl. ...................... 180/6.5; 180/6.48; 180/65.1; 180/907
(58) Field of Classification Search .................. 180/6.5, 180/6.48, 16, 24.02, 24.12, 251, 907, 65.1; 280/304.1, 250.1
    See application file for complete search history.

(56) References Cited

U.S. PATENT DOCUMENTS

| | | | | | |
|---|---|---|---|---|---|
| 2,798,565 | A | * | 7/1957 | Rosenthal et al. ............ | 180/6.5 |
| 4,119,163 | A | * | 10/1978 | Ball ............................ | 180/6.5 |
| 4,199,036 | A | * | 4/1980 | Wereb ......................... | 180/907 |
| 4,339,013 | A | * | 7/1982 | Weigt .......................... | 180/6.5 |
| 4,375,295 | A | * | 3/1983 | Volin ........................ | 280/304.1 |
| 4,422,515 | A | * | 12/1983 | Loveless ..................... | 180/6.5 |
| 4,823,900 | A | * | 4/1989 | Farnam ....................... | 180/907 |
| 4,926,952 | A | * | 5/1990 | Farnam ....................... | 180/6.5 |
| 5,862,874 | A | * | 1/1999 | Brienza et al. ............... | 180/6.5 |

FOREIGN PATENT DOCUMENTS

| | | |
|---|---|---|
| JP | 8-56991 | 3/1996 |
| JP | 10-179651 | 7/1998 |
| JP | 2004-344289 | 12/2004 |

\* cited by examiner

*Primary Examiner*—Hau V Phan
(74) *Attorney, Agent, or Firm*—Hoffmann & Baron, LLP

(57) ABSTRACT

A motorized wheelchair having transmission rollers to transmit the rotation of rear wheels to front wheels while being disposed at a transmission position between circumferential surfaces of front and rear wheels, a roller supporting arm for rotatably and oscillatingly supporting the transmission rollers in the front-rear direction of the wheelchair, and transmission roller pressure-contact springs for urging the roller supporting arm in a direction of the transmission position. An operation lever constrains the roller supporting arm in an interlocking manner in the direction away from the transmission position when being at the regular position, and releases the constrains when the operation lever being at the working position so as to allow the transmission rollers to be disposed at the transmission position.

5 Claims, 7 Drawing Sheets

MOTORIZED WHEELCHAIR

BACKGROUND OF THE INVENTION

1. Field of the Invention

The present invention relates to a motorized wheelchair having right and left motorized type rear wheels, and non-turning-type omni-directional front wheels having a plurality of rollers rotatable in a direction orthogonal to an alignment direction of the wheels are disposed for direction change around the wheels.

2. Description of the Related Art

As disclosed in Japanese Unexamined Patent Application Publication No. 8-56991 or Japanese Unexamined Patent Application Publication No. 10-179651, a two-wheel-drive motorized wheelchair is known, in which the wheels are rotatable with a circumferential surface of each wheel in a pressure contact state by drive rollers by attachably/detachably mounting a motor-driven drive unit for the auxiliary drive on the rear wheels of the motorized wheelchair. Further, as disclosed in Japanese Unexamined Patent Application Publication No. 2004-344289, a four-wheel-drive motorized wheelchair is known, in which a pair of drive units are provided on either side of the wheelchair to independently drive front and rear wheels on one side and front and rear wheels on the other side, a plurality of rollers rotatable in a direction orthogonal to an alignment direction of the wheels are disposed around a rim of each of the pair of front wheels, each roller being formed in a half-spindle shape in which the diameter of a tip portion is smaller than the diameter of a base end portion so that an outer circumference of the wheel is defined by the circumferential surface of each of the rollers, the tip portion of each of the rollers being partially inserted into a recess formed in the base end portion of an adjacent one of the rollers so as to be brought close to the adjacent base end portion, and the treads of the front wheels and the rear wheels being identical to each other.

The four-wheel-drive motorized wheelchair disclosed in the above-described Japanese Unexamined Patent Application Publication No. 2004-344289 can stably travel on a slope and an uneven road, smoothly pass over irregularities and steps, and can realize high road ability in an alignment direction. Further, high steering stability can be obtained due to the interlocking type design in the front-rear direction of the wheelchair. Still further, the steering is performed in a differential rotational manner due to the speed difference between the wheels on either side, the turning radius during turning can be reduced comparison with that of wheelchairs with an existing steering design, and a floor surface is not damaged when the wheelchair is steered indoors. Still further, an omni-directional wheel having rollers of a half-spindle shape to be partially inserted into the counterparts is employed for the right and left front wheels. Since the treads of the front and rear wheels are identical each other, noise is reduced, the wheelchair can be driven smoothly in an alignment direction or a turning direction, and catching of stones in a space between the rollers can also be suppressed.

However, when the four-wheel drive is always performed, and if a traveling area of the four-wheel drive wheelchair is not flat and any one of the wheels is idle, power is wasted, and a problem occurs, in that the circumferential surface of rollers of the omni-directional wheels can be easily damaged by the frictional rotation. On the other hand, in the case of a two-rear-wheel-drive motorized wheelchair, the center of gravity is moved forward when traveling downhill, the ground contact force of the rear wheels is reduced, the brake performance and the steerability are degraded, and the road ability is degraded when the wheelchair travels on an uneven road surface. Further, another problem occurs, in that wheels can become easily stuck in a single direction travels in a case of a wheelchair with the caster type front wheels on a road surface inclined in the transverse direction.

SUMMARY OF THE INVENTION

Accordingly, it is an object of the present invention to provide a motorized wheelchair to be switched to the four-wheel drive as necessary by a simple structure to interpose transmission rollers between front and rear wheels.

In the present inventions a motorized wheelchair having right and left motorized rear wheels, and omni-directional front wheels having a plurality of rollers rotatable in a direction orthogonal to an alignment direction of the wheel are disposed around the circumference thereof, comprises a pair of transmission rollers for transmitting the rotation of the rear wheels to the front wheels while being disposed at a transmission position between the circumferential surfaces of the front and rear wheels for easily performing the change to the four-wheel drive as required, a pair of roller supporting arms for supporting the transmission rollers rotatably and oscillatingly in the front-rear direction of the wheelchair, and transmission roller pressure-contact springs for urging the roller supporting arm in the direction of the transmission position so as to perform the pressure contact with the circumferential surface of the wheels at the transmission position. When an operation lever provided on a body frame is operated at the regular position, the roller supporting arm is constrained in an interlocking manner in a direction away from the transmission position. On the other hand, when the operation lever is operated at the working position, the roller supporting arm is spring-urged in the direction of the transmission position. The transmission rollers are reliably moved to the transmission position possibly associated with the oscillation in the front-rear direction of the wheelchair, and pressure-contacted between the circumferential surfaces of the front and rear wheels, enabling transmission of the rotation of the rear wheels to the front wheels.

According to the present invention, in a normal mode, the rear wheel driven can be performed to suppress any wasteful power consumption. On the other hand, when required in a case of traveling on a road surface with a slope or a step, or on an uneven road surface, the drive can be switched to the four-wheel drive by the lever operation, and the consistently safe and comfortable traveling can be performed due to the transmission effect even when the differential speed occurs, in particular, between the front and rear wheels. Further, the lightweight, compact and inexpensive design can be constituted for the four-wheel drive having the front and rear wheel interlocking system, and the two-wheel drive and the four-wheel drive can be easily switched from each other.

In order to ensure the operational reliability of the roller supporting arm interlocked with the operation of the operation lever, and to easily constitute the roller supporting arm, the operation lever is fixed to a rotary shaft pivotably supported by the body frame; the roller supporting arm has a first link arm for rotatably supporting each transmission roller by a tip portion of the first link arm, and a second link arm urged by the transmission roller pressure-contact spring while a tip portion of the second link arm is pivotably attached to a base end, and a base end portion of the second link arm is fixed to the rotary shaft; and elastic bodies for regulating the turning position of the first link arm with respect to the second link arm is interposed between the first link arm and the second link arm so that the transmission rollers can be oscillated in the front-rear direction of the wheelchair at the neutral position; and the second link arm is turned in the direction away from the transmission position and constrained when the operation lever being at the regular position, and the constraint of the second link arm is released when the operation lever being at the working position. Thus, the roller supporting arm can be easily constituted by the link arm to be turned in an interlocking manner with the turning operation of the operation lever, and the transmission rollers are turnably, easily and reliably moved.

In order to ensure the operational reliability of the roller supporting arm interlocked with the operation of the operation lever without being affected by the rotational state of the front wheels and to easily constitute the roller supporting arm, the operation lever is pivotably attached to the body frame; a pair of upper and lower roller supporting arms are constituted of two first link arms for rotatably supporting two transmission rollers at tip portions of the first link arms, the transmission rollers performing transmission at the transmission position on the upper and lower sides of the closest position between the circumferential surfaces of the wheels, and two second link arms urged by the transmission roller pressure-contact springs while tip portions of the second link arms are pivotably attached to base end portions of the first link arms, and base end portions of the second link arms are pivotably attached to the body frame, and elastic bodies for regulating the turning position of the first link arm with respect to the second link arms are interposed between the first link arms and the second link arms so as to oscillate the transmission rollers in the front-rear direction of the wheelchair at the neutral position; the second link arms are turned in the direction away from the transmission position and constrained when the operation lever being at the regular position; and the constraint of the second link arms is released when the operation lever being at the working position. Thus, by providing the link arm type roller supporting arms on the upper and lower sides, the transmission roller on either side is reliably bitten at the transmission position following the deceleration and stop or the automatic rotation of the front wheels irrespective of any uneven road surface, or any uphill or downhill gradient, and the transmission effect can be ensured thereby.

By mounting a base frame having the front wheels, the operation lever and the roller supporting arms on a mounting part for a caster type front wheel of the body frame of the rear wheel drive type motorized wheelchair in place of the caster type front wheel, a caster of an existing rear wheel drive type motorized wheelchair can be changed by the front wheel drive unit.

Each roller of the front wheels has a half-spindle shape in which the diameter is continuously reduced from the base end portion to a tip portion; and the tip portion of each roller is partially inserted into a recess formed in the base end portion of the adjacent rollers so that the tip portion can be brought close to the base end portion of the adjacent rollers. Since the space between the rollers is small, a consistent pressure-contact state of the transmission rollers is ensured, and catching of stones in the space during the traveling or the bumpy traveling is suppressed.

BRIEF DESCRIPTION OF THE DRAWINGS

FIG. 4 is a side view of a position regulation mechanism of the front wheel drive unit.

DETAILED DESCRIPTION OF THE PREFERRED EMBODIMENTS

Figure 5:
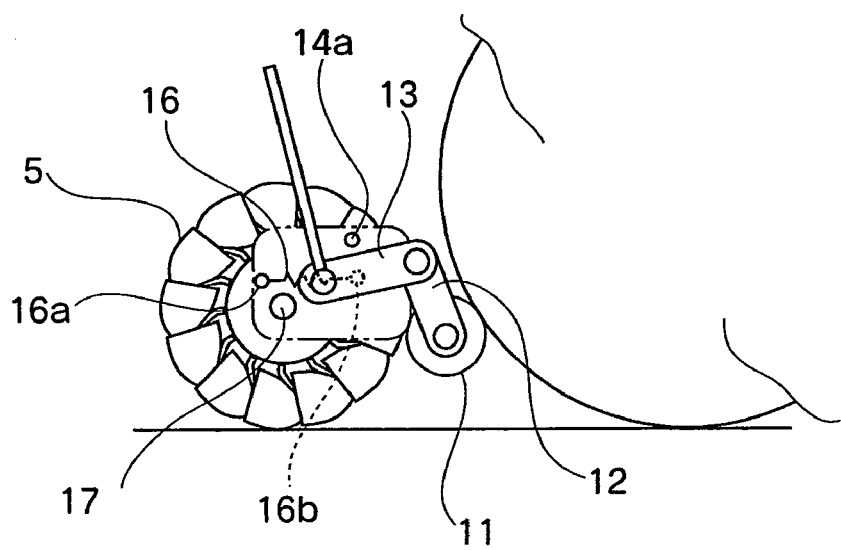
FIG. 5 is a side view to describe the state of transmission of the motorized wheelchair.
Figure 6:
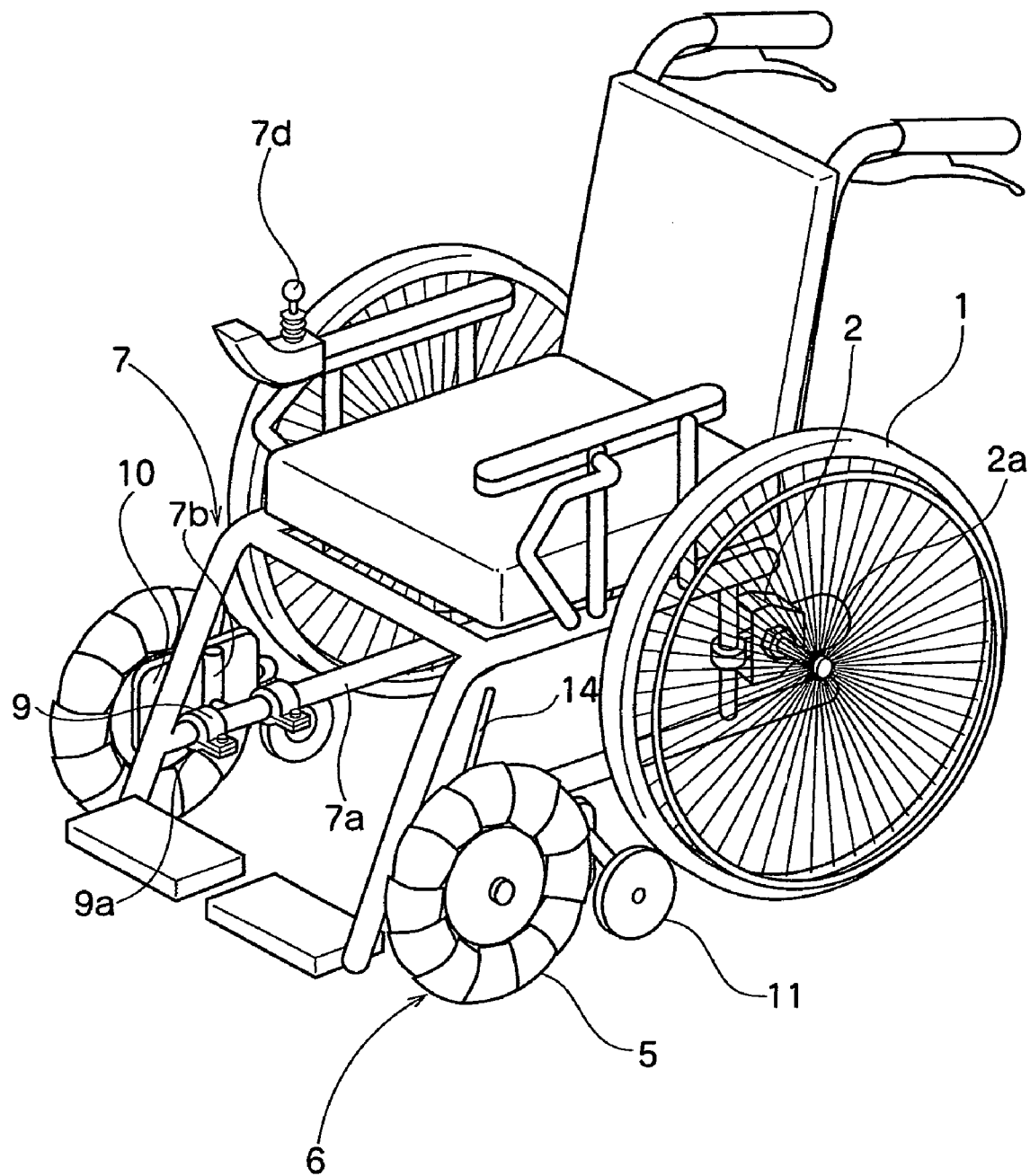
FIG. 6 is a perspective view of the motorized wheelchair.

A motorized wheelchair according to an embodiment of the present invention will be described with reference to FIGS. 1 to 6. As shown in FIG. 6, the motorized wheelchair has right and left rear wheels 1 each to be driven by a corresponding drive unit 2 using a motor 2a provided on a body frame 7, front wheels 5 of a nonturning type, namely, fixed in a direction orthogonal to a rotational direction thereof, having a plurality of rollers 6 rotatable in a direction orthogonal to an alignment direction of the wheels are disposed for direction change around the wheels, and the wheelchair is differentially steered due by supplying a difference in the rotational speed between the right and left drive units 2.

Figure 2:
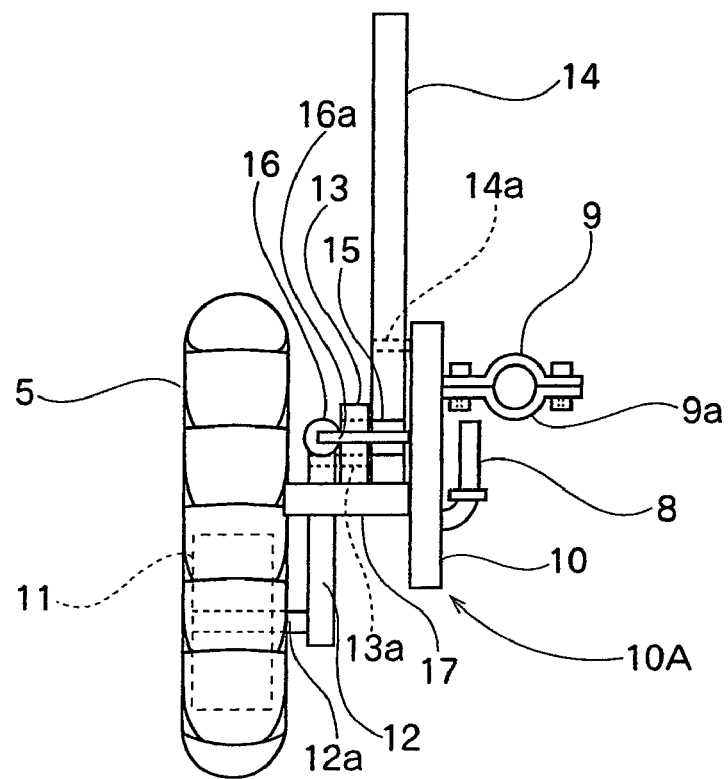
FIG. 2 is a front view of the front wheel.
Figure 3:
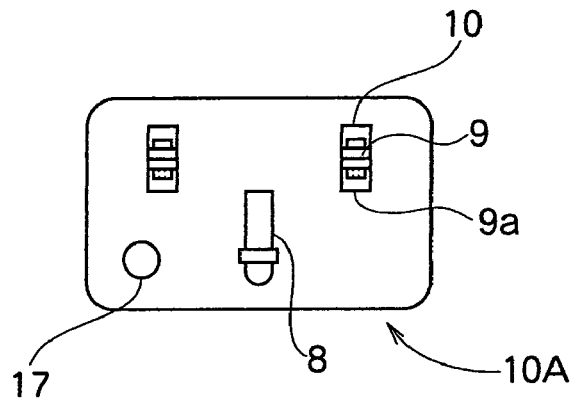
FIG. 3 is a partial side view of a front wheel drive unit.

As shown in FIG. 2 and FIG. 3, the front wheels 5 are mounted on the right and left sides at positions with the treads of the front and rear wheels 1 and 5 being identical each other and a front wheel drive unit 10A having an axle 17 rotatably supporting the front wheels 5 protruded on an outer surface thereof substitutes for caster type front wheels of an existing rear wheel drive type motorized wheelchair on its inner surface. In other words, a vertically oriented fitting pipe 8 and a horizontally oriented bracket 9 having a semi-circular part on a tip portion thereof protrude from an inner surface of a base frame 10 of the front wheel drive unit 10A, and a mounting mechanism to be screwed while a longitudinal frame 7a is held on both sides by the semi-circular part and the semi-circular bracket 9a is added. A caster-mounting pipe 7b with the fitting pipe of the caster type front wheel fitted therein is provided on a side of the tubular longitudinal frame 7a to constitute the body frame 7, and the mounting is realized by the brackets 9 and 9a while the mounting pipe 8 is fitted in the mounting pipe.

The front wheels 5 have a large diameter so as, for example, to be easily capable to ride over a step between a sidewalk and a roadway. Each roller 6 is disposed on a rim of one of the front wheels 5 around an axle 17, and formed in a half-spindle shape in which the diameter of one end of the front-rear direction or a tip portion is smaller than the diameter of the other end thereof or a base end portion so that an outer circumference of the front wheel 5 is formed of circumferential surface of each of the rollers 6, and the tip portion of each of the rollers 6 is partially inserted into a recess formed in the base end portion of an adjacent one of the rollers 6 so as to be brought close to the adjacent base end portion.

There are provided on an outer surface of each of the front wheel drive units 10A an operation lever 14, a base end portion of which is fixed to a rotary shaft 15 pivotably supported by the base frame 10, transmission rollers 11 which are interposed between the circumferential surfaces of the rear wheel 1 and the front wheel 5 to transmit the rotation of the rear wheel 1 to the front wheel 5, a roller supporting arm 12A having a link arm 12 for rotatably supporting each transmission roller 11 with a pin 12a at a tip portion thereof as an interlocking mechanism between the operation lever 14 and each transmission roller 11, and a link arm 13 with the base end portion thereof being pivotably attached to the tip portion by a pin 13a and the base end portion thereof being fixed to the rotary shaft 15 coaxially with the operation lever 14, and a tension spring 16 as a transmission roller pressure-contact spring for constraining the link arm 13 at the turning position in a toggle manner for the movement to the neutral position and the transmission position of the transmission rollers 11 in an interlocking manner with the operation of the operation lever 14 between a locking pin 16a protruded from the base frame 10 and a locking pin 16b protruded from the link arm 13.

Figure 1:
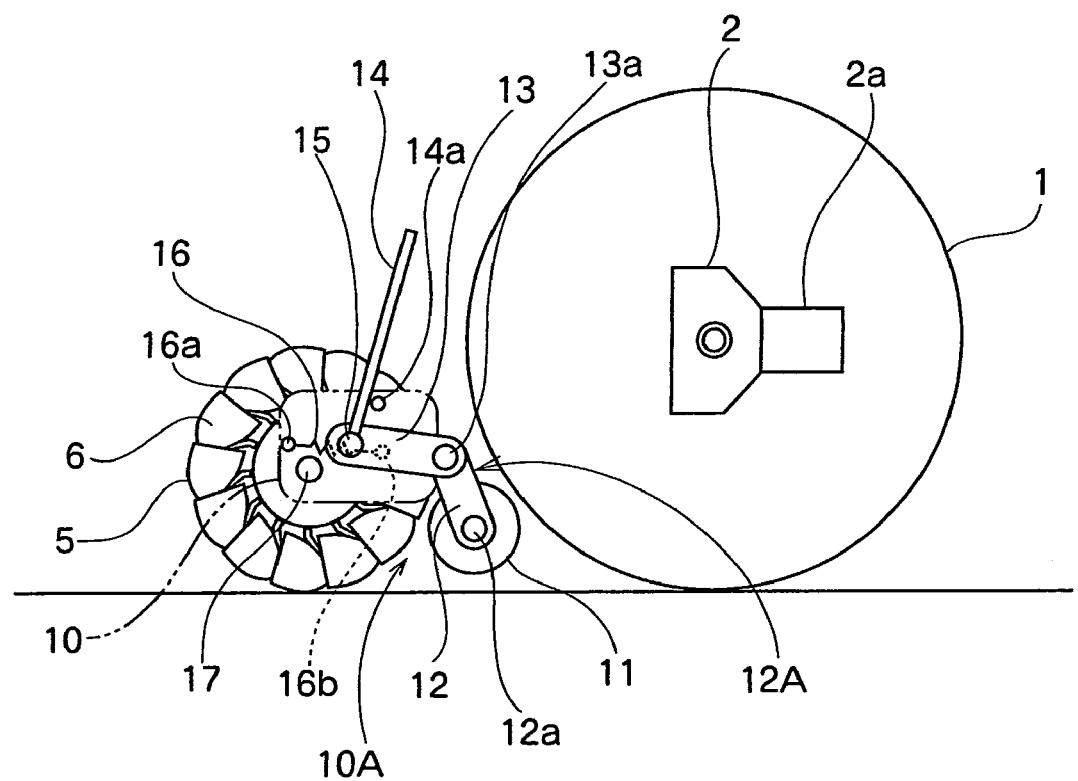
FIG. 1 is a side view of parts of front and rear wheels of a motorized wheelchair according to an embodiment of the present invention.

The spring line for connecting the locking pin 16a to the locking pin 16b is disposed at a position across the center position of the rotary shaft 15 at a substantially vertically upper position of the operation lever 14, and when the operation lever 14 is collapsed backwardly, as shown in FIG. 1, the spring line is disposed at a lower position from the center position of the rotary shaft 15 by the turn of the link arm 13; thus, the link arm 13 is turned and urged downwardly, in other words, in a direction of the counter-transmission position, and the operation lever 14 is constrained by a stopper pin 14a at the regular position protruded from the base frame 10. On the other hand, when the operation lever 14 is collapsed forwardly from the regular position, as shown in FIG. 5, the link arm 13 is turned in an interlocking manner upwardly, i.e., in a direction of the transmission position, the spring line exceeds a so-called supporting point being disposed at a position above the center position of the rotary shaft 15, the link arm 13 is turned and urged in the direction of the transmission position together with the operation lever 14, and the transmission rollers 11 is moved to the transmission position toward the closest position P1.

Figure 4A:
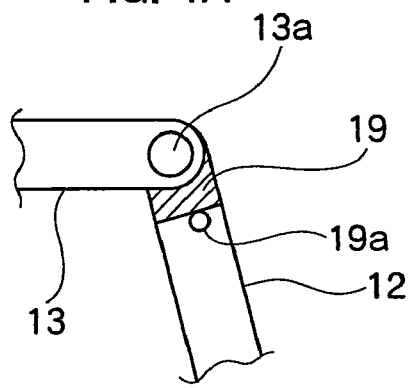
FIG. 4A shows the position regulation mechanism formed of a rubber.
Figure 4B:
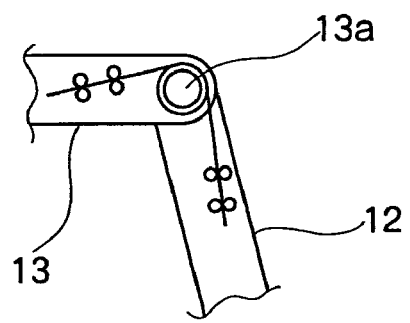
FIG. 4B shows its modification.

As shown in FIG. 4A, in the link arm 12, a positioning pin 19a protruded from its side face is elastically brought into contact with a block-shaped rubber 19 as an elastic body mounted on the circumferential surface of the tip portion of the link arm 13, the turning position with respect to the link arm 13 is regulated so that the transmission rollers 11 are disposed at the neutral position separate from both circumferential surfaces on the lower side between the front and rear wheels 1 and 5 with a substantially same distance, the rubber 19 is expanded or contracted to enable oscillation in the front-rear direction of the wheelchair. Therefore, the transmission rollers 11 are automatically moved to the transmission position to be pressure-contacted with the circumferential surface of the front and rear wheels 1 and 5 by the spring force of the tension spring 16 associated with the oscillation as necessary. The spring force of the tension spring 16 is set so as to ensure the pressure contact without any slip even when water, mud or the like is deposited on the circumferential surface of the front and rear wheels, and to reliably obtain the bite in a transmittable manner. Elastic bodies to regulate the turning position of the link arm 12 can be realized by a torsion spring 19b locked to the link arms 12 and 13 not depending on a rubber or the like, but winding the torsion spring around a projecting part of the pin 13a and retaining it thereto as shown in FIG. 4B.

The operation of the two-wheel/four-wheel switch-drive type motorized wheelchair of such a configuration is as follows. On a regular road surface, the operation lever 14 is operated to the regular position, the transmission rollers 11 are disposed at the neutral position, and the two-wheel drive is performed by the rear wheel 1, and the front wheels 5 are rotatable via the body frame 7. When the differential speed is generated in the rotation between the right and left drive units 2 in response to the operation of the steering lever 7d, the vector component in a direction orthogonal to the advancing force in the alignment direction is generated, and the rollers 6 of the front wheels 5 are also rotatable in a turning direction. Braking is also performed on the rear wheel 1 side by the operation lever 7d.

On an uneven road, a downhill slope or the like, when the right and left operation levers 14 are collapsed forwardly to the working position, the link arm 13 is turned in the direction of the transmission position due to the toggle effect by the tension spring 16, and the transmission rollers 11 are freely oscillated forwardly or backwardly and pressure-contacted at the transmission position when the transmission rollers are abutted in advance on only one circumferential surface of the front and rear wheels 1 and 5. Since the rollers 6 are closely disposed on the front wheels 5, the transmission rollers 11 are consistently pressure-contacted. In this state, when four wheels are present in a flat area, the front wheels 5 which are rotatable in a ground-contacted state via the body frame 7 travel at equal velocity in an interlocking manner with the rear wheels 1, the transmission rollers 11 are pressure-contacted with the front and rear wheels 1 and 5 and subjected to the smooth follow-up rotation without any transmission, and rotatable at the corresponding speed if the rear wheels 1 are differentially controlled.

On the other hand, when the rear wheels 1 are idle due to irregularities on a road surface, the front wheels 5 are decelerated while the rotation is transmitted via the transmission rollers 11 to enable the stable traveling. Also in a case where the front wheels 5 are abutted on a step, the wheels can smoothly ride over the step. On a downhill slope, the front wheels 5 are automatically rotated while the transmission rollers 11 are abutted from the lower side, the automatic rotation of the front wheels 5 is applied in the biting direction of the transmission rollers 11, i.e., upwardly to ensure a stable transmission state. In addition, in a case with only the rear wheel drive on a downhill slope, it is avoided by the forward movement of the center of gravity that the deceleration control or the braking by the rear wheels is hardly performed, and the deceleration control or the braking force is reliably transmitted via the transmission rollers 11. Further, a traverse flow easily occurs when the rear wheels are idle on a transversely inclined road surface by the roller 6 of the front wheels 5. However, it is suppressed because the front wheels 5 are rotatable in the advancing direction. The nonturning-type omni-directional front wheels 5 smoothly perform the follow-up traveling in the steering direction because the roller 6 is rotatable according to the component in the turning direction. Further, the rollers 6 closely form the circumferences of the wheels by reducing the space therebetween, and the wheels smoothly travel without catching stones in the space or without any play.

Figure 7:
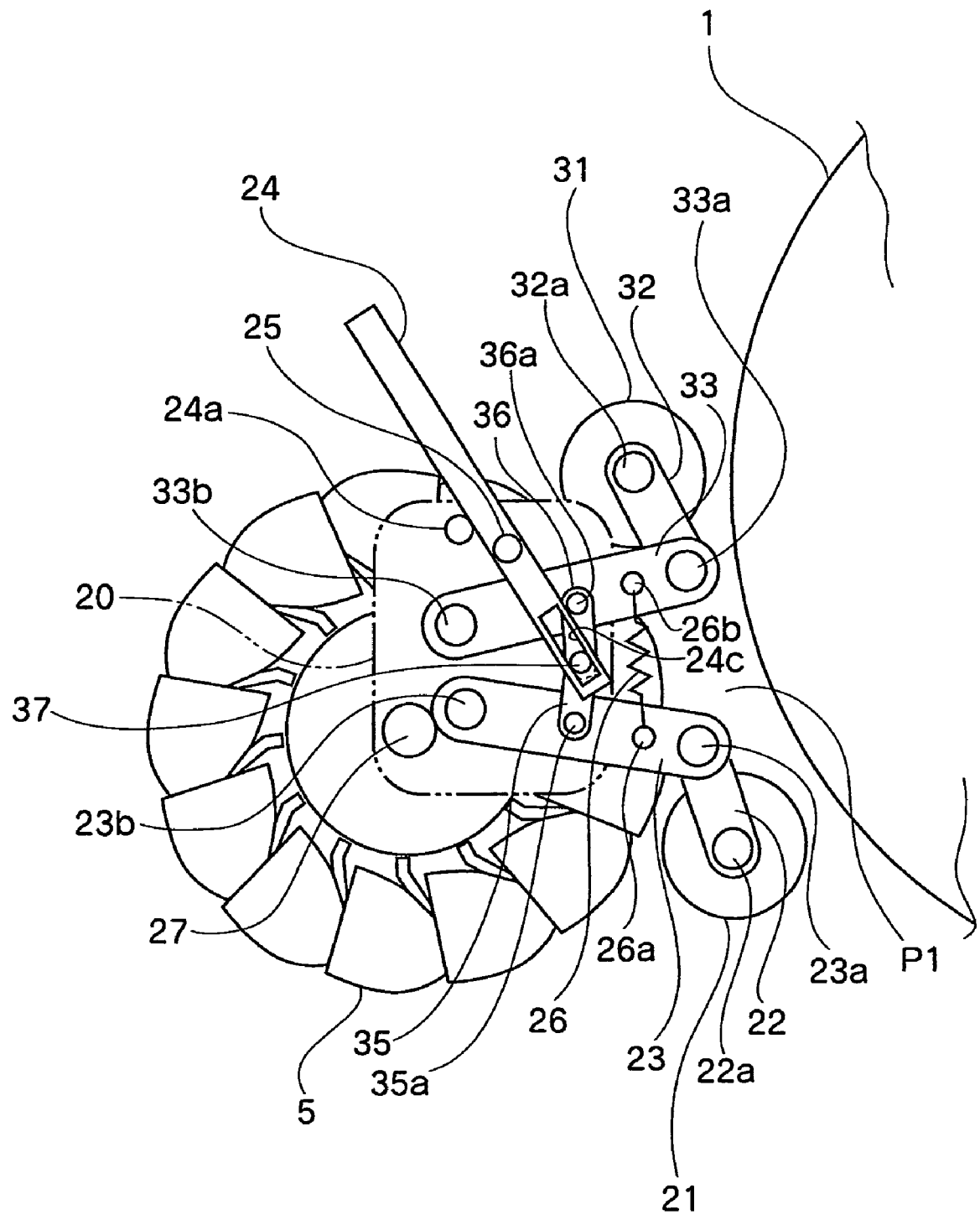
FIG. 7 is a side view of parts of front and rear wheels of the motorized wheelchair according to another embodiment.
Figure 8:
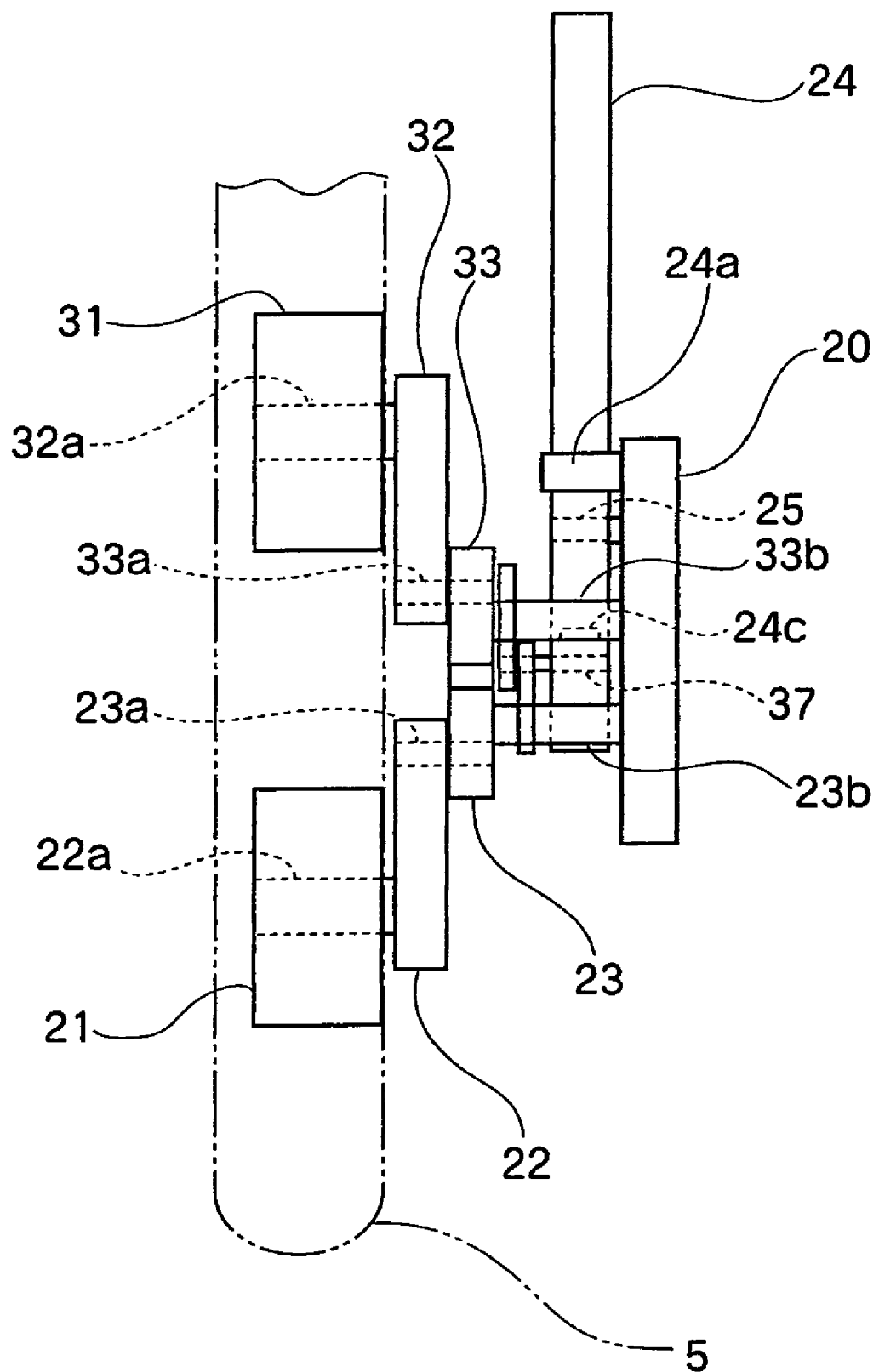
FIG. 8 is a front view of parts of the front and rear wheels of the motorized wheelchair shown in FIG. 7.
Figure 9:
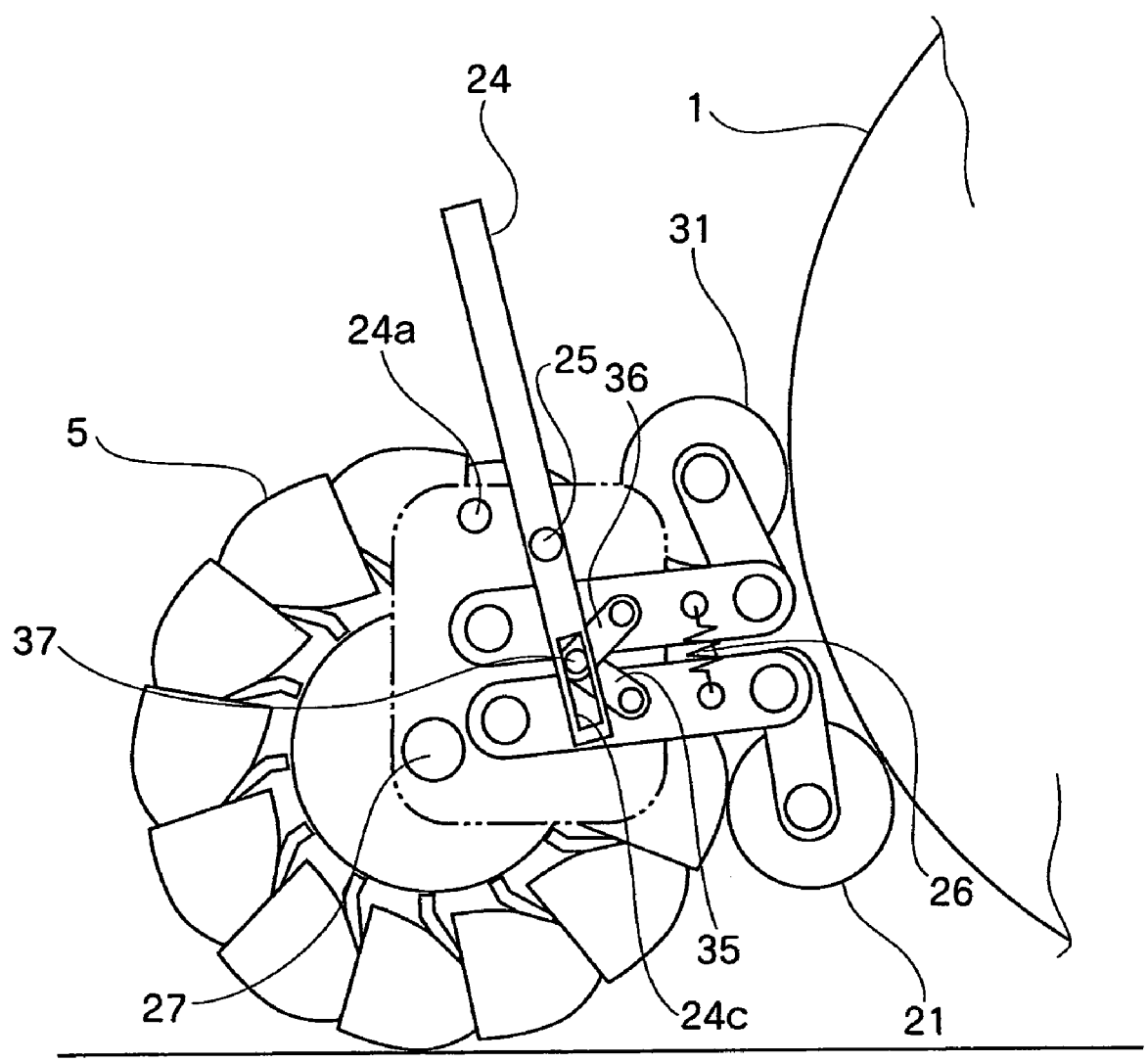
FIG. 9 is a side view to describe the state of transmission of the motorized wheelchair shown in FIG. 7.

FIGS. 7 to 9 show a motorized wheelchair according to another embodiment. There are provided on a base frame 20 equivalent to the above-described base frame an operation lever 24 pivotably attached to a spindle 25 protruded on the frame in the middle position, upper and lower transmission rollers 21 and 31 located above and below the closest position P1 between the circumferential surfaces of the front and rear wheels, upper and lower link arms 22 and 32 for rotatably supporting the transmission rollers 21 and 31 by spindle pins 23a and 33a at tip portions and upper and lower link arms 23 and 33 pivotably attached to spindles 23b and 33b while tip portions are pivotably attached to base end portions by the pins 23*a* and 33*a*, and the base end portions pivotably attached to the spindle protruded on the base frame 20, link-shaped stopper arms 35 and 36 pivotably attached to spindles 35*a* and 36*a* protruded on these link arms while the tip portions are pivotably attached to each other by a slide pin 37 slidably engaged along a long groove 24*c* formed on the side opposite to a spindle 25 in the middle of the operation lever 24, and a tension spring 26 as a transmission roller pressure-contact spring mounted between the locking pins 26*a* and 26*b* protruded on the link arms 23 and 33 so as to be disposed at the positions close to forward ends of these stopper arms. The link arms 22 and 32 are oscillatingly regulated by a similar structure to the above-described one at the turning position with respect to the link arms 23 and 33 with elasticity.

FIG. 7 shows a non-transmission state in which the operation lever 24 is collapsed forwardly and at the regular position. Since the slide pin 37 is disposed at a position backward of the line to connect the locking pins 26*a* and 26*b* to each other, the operation lever 24 is urged in the forwardly collapsed direction due to the toggle effect by the tension spring 26, and constrained by the stopper pin 24*a*. Thus, the link arms 23 and 33 are disposed at the turning position to constrain the approach to each other, and support the transmission rollers 21 and 31 at the neutral position.

On the other hand, as shown in FIG. 9, when the operation lever 24 is operated toward the rear working position, the slide pin 37 slides along the long groove 24*c*, and is moved forward of the spring line. Due to the toggle effect by the tension spring 26, the link arms 23 and 33 are turned and urged in the direction of the transmission position approaching to each other, and the transmission rollers 21 and 31 are moved to the transmission position for pressure contact with the circumferential surfaces of the front and rear wheels 1 and 5 while being oscillated in the front-rear direction of the wheelchair as necessary.

Thus, when the front wheels 5 ride over a step in a traveling state, and the rear wheels 1 are idle due to deceleration or stop, the rotational force in the biting direction is applied to, in particular, the transmission roller 31 on the upper side from the rear wheels 1, the transmission roller is pressure-contacted with the front wheels 5 to perform the rotation drive. Similarly, on an uphill slope on which the center of gravity is moved backwardly, the transmission roller 31 on the upper side reliably performs the transmission to allow the wheels to travel in a stable state. As described for the above-described embodiment, the stable travel is possible even on a downhill slope due to the presence of the transmission roller 21 on the lower side. Therefore, the wheels can travel stably on the road surfaces with irregularities, steps, front-rear or sidewise inclination, or the like.

Figure 10:
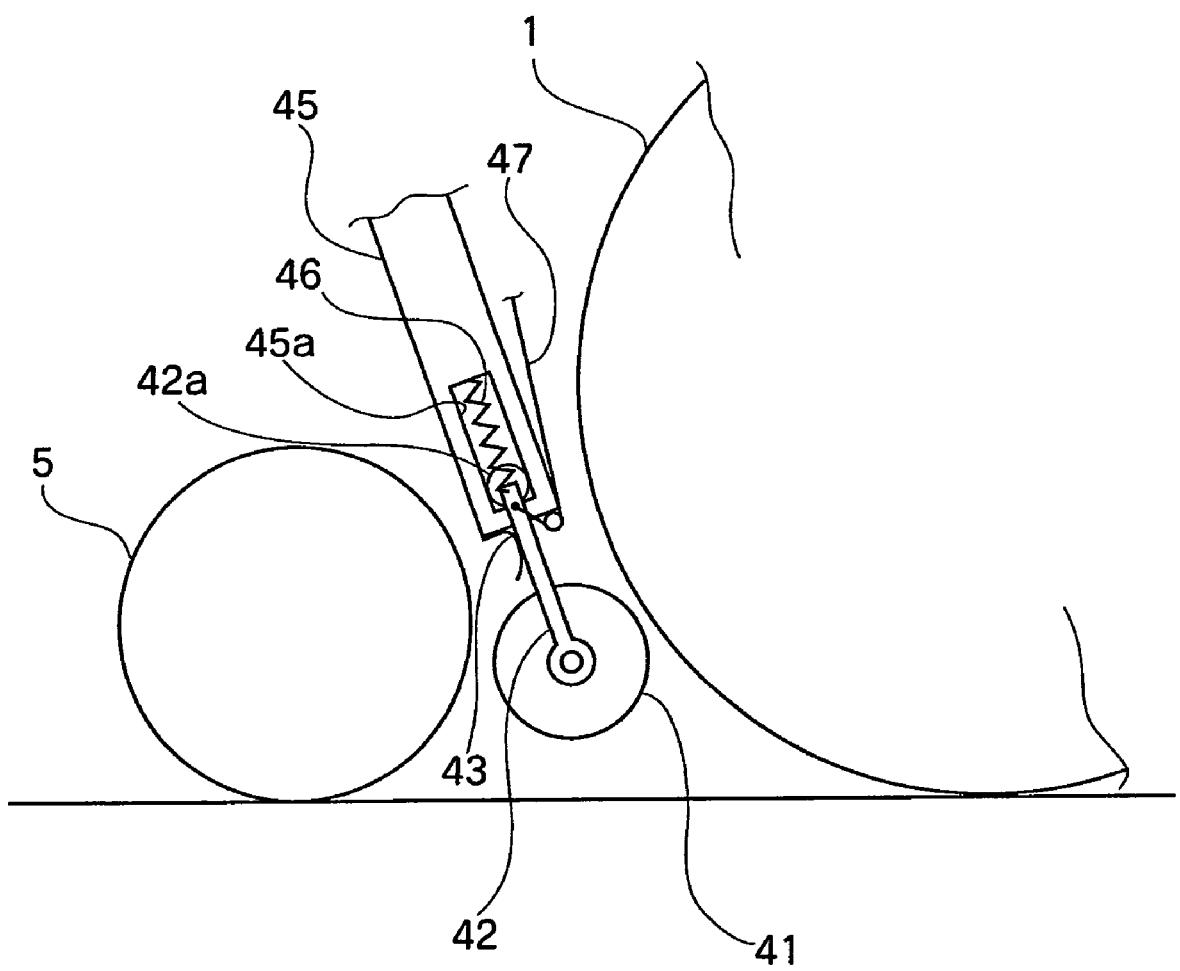
FIG. 10 is a side view of a front wheel driving part according to still another embodiment.

FIG. 10 shows a fixed type embodiment not dependent on the exchange with the caster type front wheels. A roller 42*a* protruded on a base end portion of one roller supporting arm 42 for rotatably supporting the transmission roller 41 at a tip portion is rotatably and slidably engaged in a long groove 45*a* of a guide part 45 integrated with the body frame 7. The roller supporting arms 42 are regulated in the neutral position oscillatingly in the front-rear direction of the wheelchair by a leaf spring 43 as an elastic body, and urged in the direction of the transmission position by a tension spring 46. In the state shown in the figure, the roller supporting arms 42 are pulled by an operation lever (not shown) via a wire 47, and constrained at the neutral position against the spring force. When the constraint is released, the transmission roller 41 is possibly oscillated with a roller 42*a* as a supporting point, and moved to the transmission position where the transmission roller is pressure-contacted to the circumferential surfaces of the front and rear wheels 1 and 5. The operation lever can be constituted of only one of the right-to-left interlocking type by commonly pulling a wire 47 belonging to the right and left roller supporting arms 42 to the regular position. In addition, a configuration of interlocking a roller supporting arm with the operation lever so as to be driven by a cam may be considered as another embodiment.

What is claimed is:

1. A motorized wheelchair having right and left motorized rear wheels, and omni-directional front wheels having a plurality of rollers rotatable in a direction orthogonal to an alignment direction of wheels disposed for direction change around the circumference thereof, comprising:

an operation lever provided on a body frame and operable between a regular position and a working position, a pair of transmission rollers for transmitting the rotation of the rear wheels to the front wheels while being disposed at a transmission position between circumferential surfaces of the rear wheels and the front wheels, a pair of roller supporting arms provided on the body frame so as to be movable between a neutral position and a transmission position while the transmission rollers are supported rotatably and oscillatingly in the front-rear direction of the wheelchair, and transmission roller pressure-contact springs for urging the roller supporting arms in the direction of the transmission position so that the transmission rollers are pressure-contacted with the circumferential surfaces of the wheels when at the transmission position, wherein the operation lever constrains the roller supporting arms in an interlocking manner in a direction away from the transmission position when at the regular position, and the constraint of the roller supporting arm is released when the operation lever being moved to the working position.

2. The motorized wheelchair according to claim 1, wherein the operation lever is fixed to a rotary shaft pivotably supported by the body frame; the roller supporting arms have a first link arm for rotatably supporting the transmission rollers by a tip portion of the first link arm and a second link arm urged by the transmission roller pressure-contact springs while a tip portion of the second link arm is pivotably attached to a base end portion of the first link arm, and a base end portion of the second link arm is fixed to the rotary shaft; and elastic bodies for regulating the turning position of the first link arm with respect to the second link arm interposed between the first link arm and the second link arm so that the transmission rollers can be oscillated in the front-rear direction of the wheelchair at the neutral position, and wherein the second link arm is turned in the direction away from the transmission position when the operation lever being at the regular position, and constrained, and the constraint of the second link arm is released by the operation lever being moved to the working position.

3. The motorized wheelchair according to claim 1, wherein the operation lever is pivotably attached to the body frame; a pair of upper and lower roller supporting arms are constituted of two first link arms for rotatably supporting two transmission rollers at tip portions of the first link arms, the transmission rollers performing transmission at the transmission position on the upper and lower sides of the closest position between the circumferential surfaces of the wheels, and two second link arms urged by the transmission roller pressure-contact springs while tip portions of the second link arms are pivotably attached to base end portions of the first link arms, and base end portions of the second link arms are pivotably attached to the body frame, and elastic bodies for regulating the turning position of the first link arm with respect to the second link arms are interposed between the first link arms and the second link arms so as to oscillate the transmission rollers in the front-rear direction of the wheelchair at the neutral position, and wherein the second link arms are turned in the direction away from the transmission position when the operation lever being at the regular position, and constrained, and the constraint of the second link arm is released when the operation lever being at the working position.

4. The motorized wheelchair according to claim 1, wherein a base frame having the front wheels, the operation lever, and the roller supporting arm is mounted on a mounting part for a caster type front wheel of the body frame of the rear wheel drive type motorized wheelchair in place of the caster type front wheel.

5. The motorized wheelchair according to claim 1, wherein each roller of the front wheels has a half-spindle shape in which the diameter is continuously reduced from a base end portion to a tip portion, and the tip portion of each roller is partially inserted into a recess formed in the base end portion of the adjacent rollers so that the tip portion can be brought close to the base end portions of the adjacent rollers.

* * * * *